(12) United States Patent
McGuinness et al.

(10) Patent No.: US 10,551,189 B2
(45) Date of Patent: Feb. 4, 2020

(54) GYROSCOPIC BALANCE UNIT AND PRECESSIONAL PROPULSION METHOD

(71) Applicants: Mario Fredrick McGuinness, Bellflower, CA (US); Don M Kartchner, Bellflower, CA (US)

(72) Inventors: Mario Fredrick McGuinness, Bellflower, CA (US); Don M Kartchner, Bellflower, CA (US)

(*) Notice: Subject to any disclaimer, the term of this patent is extended or adjusted under 35 U.S.C. 154(b) by 1103 days.

(21) Appl. No.: 14/214,101

(22) Filed: Mar. 14, 2014

(65) Prior Publication Data

US 2016/0161255 A1 Jun. 9, 2016

Related U.S. Application Data

(60) Provisional application No. 61/852,183, filed on Mar. 15, 2013.

(51) Int. Cl.
*G01C 19/06* (2006.01)
*G01C 19/02* (2006.01)

(52) U.S. Cl.
CPC .................................. *G01C 19/02* (2013.01)

(58) Field of Classification Search
CPC ....................................................... G01C 19/02
USPC ............................................................. 74/84 S
See application file for complete search history.

(56) References Cited

U.S. PATENT DOCUMENTS

| | | | |
|---|---|---|---|
| 2,857,122 A * | 10/1958 | Maguire | B64G 1/28 244/3.21 |
| 4,826,716 A | 5/1989 | Roberts et al. | |
| 7,326,156 B2 | 2/2008 | Dworzan | |
| 7,383,747 B2 | 6/2008 | Tippett | |
| 7,563,210 B2 | 7/2009 | Smith | |
| 7,935,035 B2 | 5/2011 | Smith | |
| 8,272,283 B2 * | 9/2012 | Vafaey | B06B 1/162 74/84 S |
| 8,652,012 B2 | 2/2014 | Smith | |
| 2007/0295123 A1 * | 12/2007 | Tarnopolsky | F03G 3/02 74/84 S |

* cited by examiner

*Primary Examiner* — Jake Cook
(74) *Attorney, Agent, or Firm* — Kenneth L. Green; Averill & Green

(57) ABSTRACT

An apparatus integrates two gyroscopes into one unit, allowing their forces to unite in such a manner that they work together in balanced harmony. This is achieved by applying a "precessional propulsion method" of operation to the gyroscopic balance unit to harness balance and direct gyroscopic forces so they flow together and work as a team, developing dual-balanced gyroscopic precession that in turn generates balanced propulsion.

15 Claims, 9 Drawing Sheets

GYROSCOPIC BALANCE UNIT AND PRECESSIONAL PROPULSION METHOD

CROSS REFERENCE TO RELATED APPLICATION

This application claims the benefit of Provisional Application Ser. No. 61/852,183 filed Mar. 15, 2013 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in gyroscopes used in balance and application of force. More particularly, the present Gyroscopic Balance Unit and Precessional Propulsion Method uses gyroscopic force to create linear motion or push forces for lifting or to push upon an object in a particular direction.

Description of Related Art Including Information Disclosed Under 37 CFR 1.97 and 1.98

Gyroscopes have been used for a variety of purposes. One of the most common uses is for stability or direction when the gyroscope is used in a plane for navigation. Gyroscopes have also been used for exercise to provide resistance when the gyroscope is rotated out of the spin axis.

One inventor, Raymond Kelly Tippett's U.S. Pat. No. 7,383,747 that issued on Jun. 10, 2008 used a totally different concept was using three concentric flywheel rings pivotally connected "perpendicular" to each other to resist movement in three directions, which he called equal force presence (definitely he has a brilliant idea worthy of respect). The three rings were of different sizes and materials, so each ring would generate similar forces, but those conditions alone cannot function or perform as a gyroscopic balance unit does, as they are two totally different pivotal arrangements and concepts, and they are operated in a totally different manner. For the first ring he used titanium, the second was stainless steel, and the third was a tungsten nickel alloy. The first and second, or the second and third material types might be borrowed and used in the wheel and ring gyroscopic balance unit of the present invention. The wheel and ring may be altered in size and shape as mentioned earlier to achieve equal overall density.

What is needed is use of two or more gyroscopes to create linear force. Multiple gyroscopes can be used to direct the force in a linear direction where opposing torque forces create stability, and the continuation of the flywheels pivotal action, during dual balanced precession creates linear force, push or lift.

BRIEF SUMMARY OF THE INVENTION

It is an object of the gyroscopic balance unit and precessional propulsion method to house a flywheel and flywheel ring from a matching set as shown here. The two flywheels may be arranged so they are substantially concentric to each other, and may be of different diameters and materials It is an object of the gyroscopic balance unit and precessional propulsion method to use substantial alignment of two gimbal type pivotal axes from two different flywheels where forces, positions, timing, and direction all converge within the balance unit.

It is an object of the gyroscopic balance unit and precessional propulsion method as a process or method of operation that would be applied to a gyroscopic balance unit to harness and control its forces.

It is another object of the gyroscopic balance unit and precessional propulsion method to house a particular type of flywheel set, and all flywheel sets are matching sets of two. They may be matched in the forces they generate, such as kinetic energy and angular momentum. They may or may not be of the same size, shape or material. They may be described as two flywheels that can generate similar magnitudes of rotational inertia. The balance unit is separated into two basic groups or embodiments depending on the type of matching flywheel sets they house.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
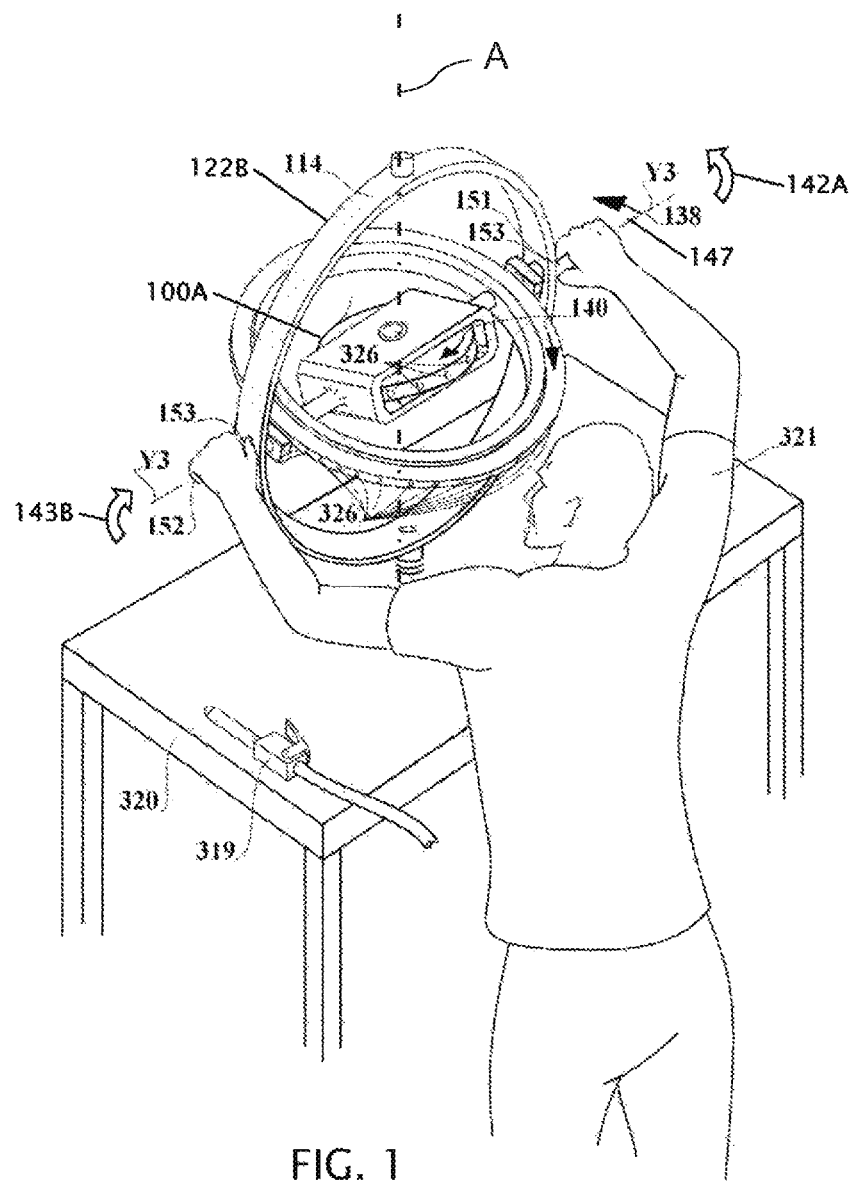
FIG. 1 shows a perspective view of the gyroscope balance unit on a table being manipulated by a person.

FIG. 1 shows a perspective view of the gyroscope balance unit on a table being manipulated by a person.

The "Gyroscopic Balance Unit" is a label given to the major physical apparatus of the present invention. The gyroscopic balance unit is presented in two basic styles or embodiments.

The "Precessional Propulsion Method " is a term given to the process or method of operation that would be applied to a gyroscopic balance unit to harness and control its forces.

"Dual-Balanced Gyroscopic Precession" is a term given to the basic features, conditions, and forces that are in balance when the precessional propulsion method is applied to a gyroscopic balance unit, and that action in turn induces gyroscopic precession, but not ordinary gyroscopic precession. What is called herein as dual-balanced gyroscopic precession.

The "Balance Line" is a term given to the substantial alignment of two gimbal type pivotal axes from two different flywheels where forces, positions, timing, and direction all converge within the balance unit.

In this view the particular balance unit is labeled the Wheel and Ring Balance Unit 114, and is one of the embodiments of the present invention. It houses a flywheel 100 and a flywheel ring 122. They may be identified as flywheel 100A and flywheel ring 122B when they are in a matching set, usually arranged together as shown here.

All balance units house a particular type of flywheel set, and all flywheel sets are matching sets of two. They may be matched in the forces they generate, such as kinetic energy and angular momentum. They may or may not be of the same size, shape or material. They may be described as two flywheels that can generate similar magnitudes of rotational inertia. The balance unit is separated into two basic groups or embodiments depending on the type of matching flywheel sets they house:

1. The wheel and ring embodiment
2. The twin ring embodiment

The Wheel and Ring Balance Unit" could house a flywheel and flywheel ring from a matching set as shown here. The two flywheels may be arranged so they are substantially concentric to each other, and may be of different diameters and materials.

2. The "Twin Ring Balance Unit" would house two flywheel rings from a matching set, preferably substantially similar in dimension, shape, and material.

Research and Development

After an earnest and persistent research and development effort, finally the pieces of the puzzle started to fit together, revealing that under the correct conditions:

1. If a standard single gimbaled-gyroscope is positioned so that the pivotal axis of its flywheel is horizontal and level before precession is induced, the pivotal action of the flywheel during gyroscopic precession can drive that pivotal axis into a curved lifting tilt on one side, and if that pivotal axis were to be held horizontal and level during gyroscopic precession while the flywheel continues its pivoting action, its force would continue pushing upwards.

2. If a second flywheel were added to the same gyroscope that could generate a second curved lifting tilt of equal magnitude from its pivotal action on the opposite side of that same pivotal axis, then the tilting action would be canceled when the tilting action has ceased, but the two spinning flywheels still continue their pivotal action, both generating force on opposite sides of their pivotal axis.

The concept of "the balance linen emerged two gyroscopes. One gyroscope could be positioned inside the other with their pivotal axis substantially aligned, and that aligned arrangement would be labeled the "balance line".

The process or method of operation was then developed. "The Precessional Propulsion Method" is a list of step-by-step instructions that guide the gyroscopic forces in such a manner that they can be harnessed. You could control one gyroscope with another in a balanced harmonious united direction, generating controlled linear propulsion. This is developing what could be described as "dual-balanced gyroscopic precession.

Description

FIG. 1 shows a basic wheel and ring gyroscopic balance unit 114. The flywheel 100 used in the prototype model may be a round disc shape, as well as other shapes. Its function is to assist in generating gyroscopic forces. It could be made from tool steel with an outside diameter, near 4 inches, and a thickness of near 1 inch.

The flywheel ring 122B has the basic function to assist in generating gyroscopic forces. Its shape may be described as a flat ring made from aluminum or other materials, 1 inch thick, an inside diameter of near 11 inches, and an outside diameter of near 13 inches. The two flywheels could be fabricated using industrial methods and should be balanced for high speeds. They were machined down to weigh about 3½ lbs each. The majority of material was left around the outer rim. These dimensions and materials are only rough suggestions, and were used to demonstrate the principle concept behind the invention, and are not meant to limit the scope of the present invention in any way, shape, or form. Their size, shape, material, weight, and the speed that they ran, estimated at 2000-3000 R.P.M., but may have actually been much faster, as a handheld router with a rubber drive wheel mounted where a router bit would normally fit was employed to spin the flywheels on the same test. The router was a Bosch Colt model IHP, advertised to run at speeds as high as 35,000 R.P.M. The speeds mentioned should not be considered accurate and were used for testing and to demonstrate the concept. In this particular embodiment, many other motors and methods could be used to spin the flywheels, motors that run as high as 100,000 RPM are available. Those two flywheels formed a matching set. Another way to describe all the balance units is to imagine placing one entire gyroscope inside another, thus setting up the physical arrangement for "Dual-Balanced Gyroscopic Precession" to be generated, and could be described as being:

Substantially symmetrical
Balanced in magnitudes of force
Balanced in its concentric positioning
Balanced in its simultaneous timing
Balanced in its opposing pivotal direction all in and around the balance line.

These conditions and features may be found in all of the embodiments.

In order to balance the forces of two flywheels with different size diameters so one could fit inside the other, different materials of different density could be used so the larger flywheel ring 122 may be made from a less dense material than the smaller flywheel ring 100. One example could be if one flywheel has twice the volume of the other, and the thickness of their planes are similar, then one could use a material with half the density of the other. The material's density could change so the overall density of the two flywheels could be matched as:

Mass=density×volume, and it is preferred that the two flywheels are similar in weight.

Other materials could also be used to achieve substantially matching density in the flywheel 100 and the flywheel ring 122. As mentioned, two flywheels from a matching set would be substantially equal in their overall density. Then two flywheels that are equal in size, shape, and material would obviously be substantially equal enough to be considered a matching set. Such is the case with the twin ring embodiment.

The twin ring embodiment is basically what its name implies: two flywheel rings that are substantially the same in shape, size, and material. They are arranged such that one is interlinked with the other, which places them in a position that is not as concentric as the other embodiments, and their pivotal travel is not as broad as other embodiments, but matching their force is very easy if they weigh the same and could spin at the same speed.

Figure 6A:
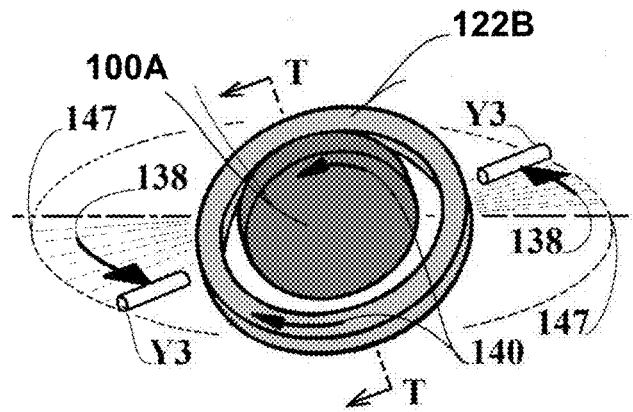
FIG. 6A-6F show a series of pivotal path two flywheels, the wheel and ring style.
Figure 6B:
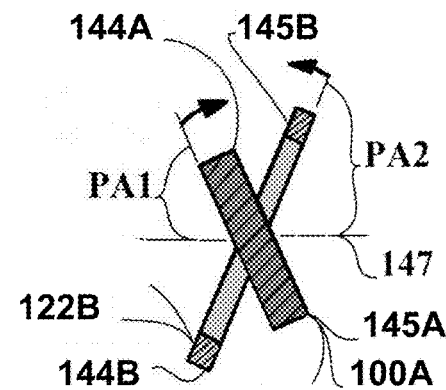
Figure 6C:
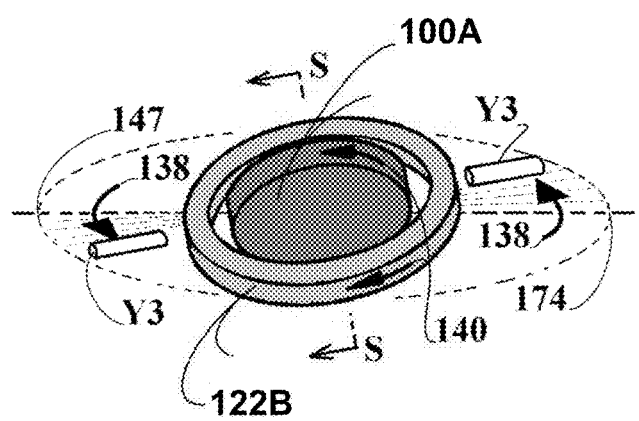
Figure 6D:
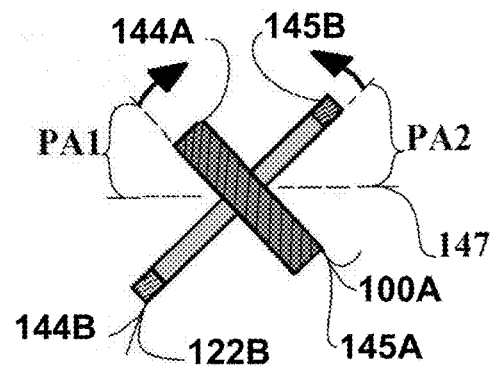
Figure 6E:
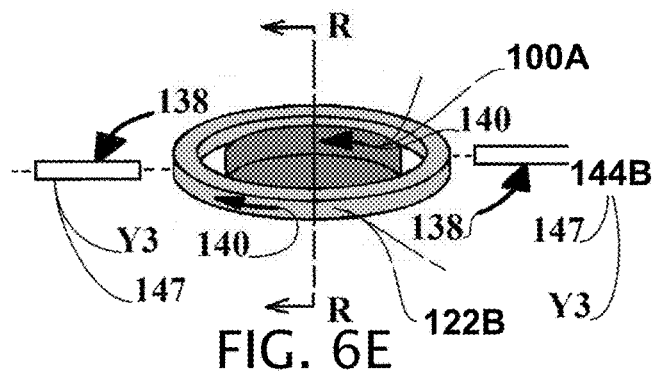
Figure 6F:
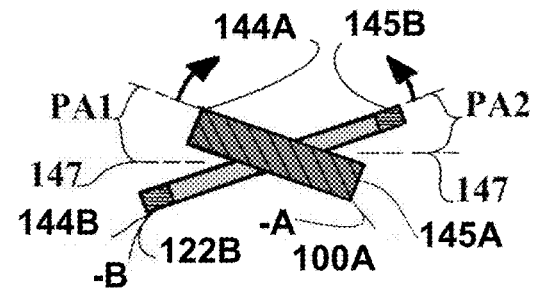

The operator 321 would position the flywheel and flywheel ring in a good starting position described in FIGS. 6E and 6F, then he could aim the air nozzle 319 at the notches 326 and spin one flywheel rapidly, and then the other in a clock-wise direction 140. The air nozzle may be connected to an industrial air compressor that is commercially available. With the two flywheels in position and spinning rapidly, the system is primed. The operator can then grip the turnbuckle 153, on the right side 151, and the turnbuckle 153, on the left side 152, of the balance unit. The turnbuckles are aligned on the balance line Y3 and they should be held in their normal operating position, which is horizontal. Turn buckle ends are one-half of a common turn buckle found at hardware stores and are only used as handles. Standard bolts could also be used if the bolts have a reduced diameter tip to facilitate pivotal movement.

The operator can now rotate the entire balance unit in a counter clockwise direction 138, along a horizontal plane 147, by pushing on the right side and pulling on the left. This action induces dual-balanced gyroscopic precession. As both flywheels are simultaneously driven into their pivotal swinging motion, changing the position of their planes, as each flywheel is generating its own lift on one side of the unit 142A and 143B, and together their combined lifting force generates balanced lift, and the balance unit ascends. This dual-balanced gyroscopic precession may produce synergy, for example. If two flywheels are not arranged and operated in the method described herein, the result would be uncoordinated and sporadic jumping and bouncing, "anything but balanced lift". It is balanced from balanced forces, balanced positions, balanced timing, and balanced direction, all working together in harmony to generate balanced lift curved force directed into linear motion. The more the operator rotates the balance unit, the more it lifts off the table 320.

In this example the person 321 is getting a real workout as he rotates the balance unit, and at the same time, he tries to hold it on the table. The more he rotates, the more it lifts. As he rotates further, the two flywheels continue to pivot and when they reach or get near the top of their stroke, and their spinning planes are near a vertical, then he can suddenly reverse the rotation of the balance unit from counterclockwise 138 to clockwise 140 instantly, driving the other side of the flywheels to pivot upwards, and generating lift from the second stroke. This entire process may be continually repeated as described in this application. Although the operator is holding the gyroscopic balance unit with its balance line on a horizontal plane, and the unit is pushing upwards or perpendicular to that plane, the entire unit could be turned sideways, positioning its balance line on a vertical plane, and then the balance line could be rotated, and the balance unit would be propelled in a horizontal direction. The balance units will push perpendicular to the rotation of its balance line, and could be used to apply a pushing force in many directions, to perform many different tasks.

Figure 2:
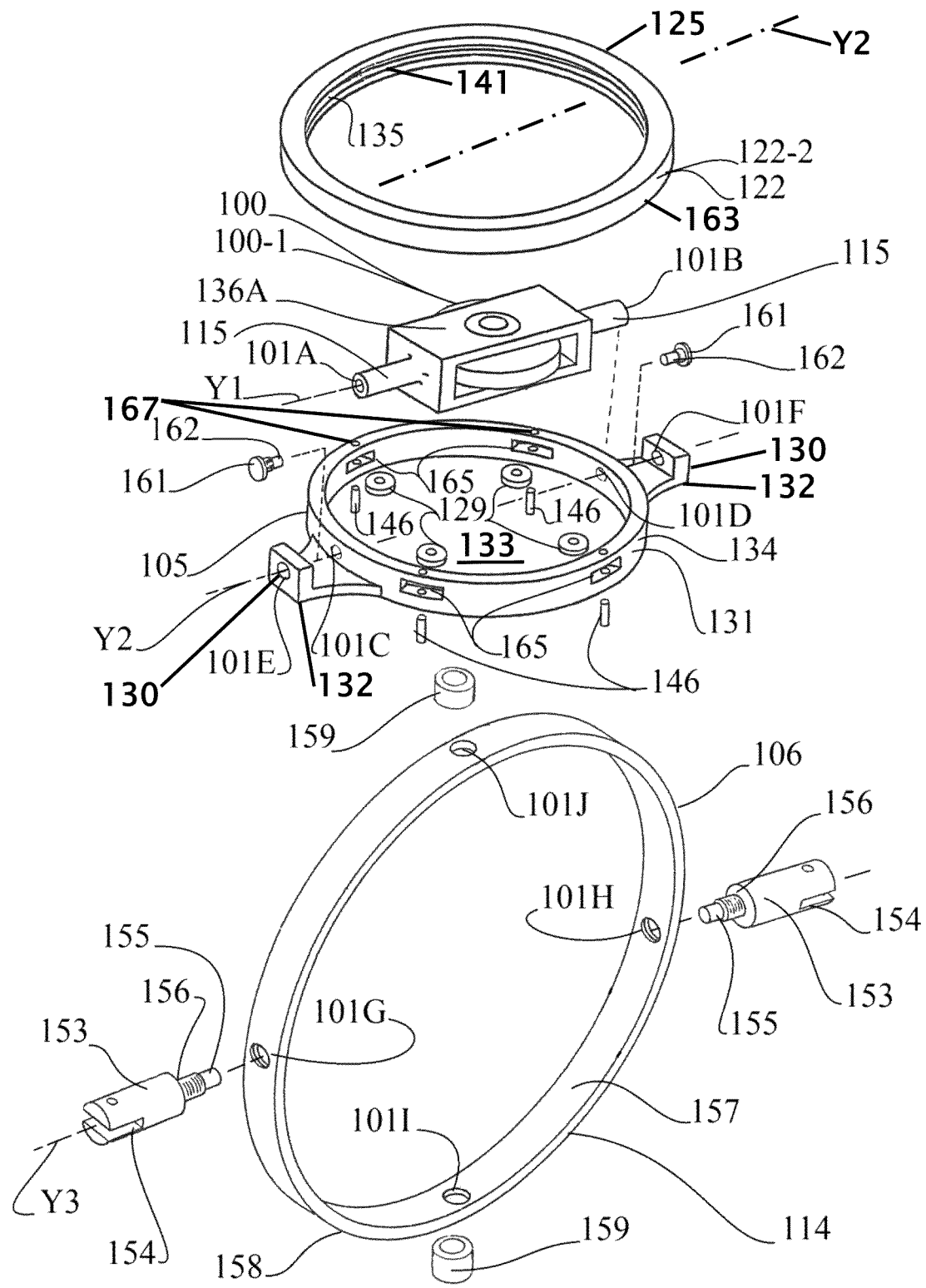
FIG. 2 shows an assembly of a wheel and ring balance unit.

FIG. 2 shows an assembly of a wheel and ring balance unit 114 that could consist of the following components. A double gimbal axle 105 may be described, as a structural shape that supports a bearing system that's purpose is to provide a substantially rigid rotatable connection between the structure and a flywheel ring to allow it to rapidly spin on its axis. The structure may also include a number of substantially aligned pivotal features that allow the structure and its rotatable attached flywheel ring to pivot on an axis that bisects its diameter and the thickness of the flywheel ring's plane. These pivotal features may be positioned outside and or inside the flywheel ring's diameter or circular shape.

The double gimbal axle 105 may also be described as a rigid configuration that could be fabricated from known industrial methods and materials. Aluminum or Kevlar, or similar materials, may be suitable. It should be able to retain a rapidly spinning flywheel ring while providing pivotal support that is perpendicular to the spinning axes of the flywheel ring. The double gimbal axle 105 should provide pivotal support for the flywheel ring 122. That pivotal support should align with the centerline axis Y2 of the flywheel rings plane and it should also provide rotational spin support to allow the flywheel ring to spin. The double gimbal axle may also provide pivotal support for the gimbal block assembly 136A along its pivotal axis Y1. That pivotal support could align the pivotal axis Y1 of the flywheel 100 and the Y2 pivotal axis of the flywheel ring 122. The double gimbal axle may also provide pivotal support for a second double gimbal axle aligning both of them on their axis Y. This type of alignment is described with the twin ring balance unit. The double gimbal axle may provide pivotal support for the flywheel ring on its Y2 pivotal axis through the aligned pivotal features or holes 101 E, and 101 F, positioned in the two end blocks 130. A second set of aligned pivotal features or holes IOIC, and 101 D may be positioned on opposite sides of the circular-shaped wall 131.

The pivotal features 101 C, 101 D, 101 E, and 101 F may also substantially align with each other. The pivotal feature 101 E in the end block 130 may be connected to the pivotal feature 101 C in the wall through a bridge 132. The pivotal feature 101 F in the block 130 at the other end may be connected to the pivotal feature 101 D in the wall through another bridge 132. The bridges may be positioned above or below the flywheel ring's spinning, path. The bridge's and block's size, shape, or position should not impede the spinning action of the flywheel ring. The cavity space 133 between the pivotal features 101 C and 101 D may be described as the inside diameter of the circular shaped wall 131. It may be large enough to provide pivotal clearance for the gimbal block assembly 136A as it swings on its pivotal features 101A and 101 B. The outside diameter 134 of the wall 131 should be smaller than the inside diameter 135 of the flywheel ring 122. The double gimbal axle may be altered in size, shape, or material to support any flywheel ring that would be part of a matching flywheel set.

A plurality of cut out windows 165 to provide clearance for the bearing 129 may be evenly positioned around the wall 131. The windows should be positioned so as to allow the group of bearings to form a flat circular shape on a flat plane. A hole 167 may be sized to accept the pin 146 and positioned in-between the cavity 133 and the outside diameter 134 in the wall over each window in such a way as to allow a pin 146 to be inserted through the hole and into the bearing and hold the bearing securely in place in the window and allow it to run smoothly. The windows should be sized and placed to allow the bearings as a group, to position the flywheel ring so it could be centered in its plane on the aligned features 101 F and 101 E.

Bearings 129 may be positioned and orientated to all be on the same flat plane. The bearings could be installed thru the windows to form a flat circular-shaped path as a group with an outside diameter. The size of that circular-shaped path would position each bearing in its plane to partially extend past the outside diameter of the wall so the circular-shaped path could sit inside the flywheel ring's inside diameter groove 141 in such a manner that the flywheel ring 122 can spin smoothly at a fast pace when assembled. The flywheel ring's inside diameter 135 may have a groove 141 that is concentric with its inside diameter 135 and outside diameter 163, and centered in the thickness of its plane 125. The groove would be in true position to the flywheel ring, and should be deep and wide enough to allow the circular-shaped group of bearings to fit inside that groove 141, and allow the flywheel ring to spin freely with its plane centered on the aligned features 101F and 101E. The bearings and pins are commercially available.

The gimbal block assembly 136A, may be described as a standard type of flywheel in a housing that allows it to spin and pivot perpendicular to its spin axis extension tubes 115 on each side could be used to extend the pivotal axis.

The flywheel ring 122 could be lowered over the balance axle, placing its inside diameter 135 over and outside the outside diameter 134 of the double gimbal axle's wall 131. The bearings 129 can then be installed into the cut out window 165 and be secured by the pins 146, and the flywheel ring should then run smoothly on those bearings.

When pivotally connecting the double gimbal axle assembly to an outer hoop frame 106, the axle assembly should be positioned inside the outer hoop frame in such a way as to place its pivotal features or holes 101E and 101F in between the holes 101G and 101H in the hoop frame, and then installing the turnbuckle end 153 through the hole 101G and into the hole 101E in the double gimbal axle assembly. Turnbuckle ends are one end of a turnbuckle. They are commercially available in many sizes and of many different materials. If they are welded to the hoop frame, they could be of the same material as an outer hoop frame 106. The reduced diameter 155 of the turnbuckle end could be the portion that would go through the hole in the hoop frame and then into the hole in the double gimbal axle, and then its shoulder 156 could be welded to the hoop frame. Any arrangement that could pivotally connect the double gimbal axle assembly to the outer hoop frame, aligning their pivotal axis to develop the balance line Y3 connection could be applied. Then repeat that operation on the other side with another turnbuckle end 153 being installed into the hole 101H and into the hole 101F on the other side of the assembly. The outer hoop frame 106 may take many shapes and sizes, and be made of many materials such as steel, aluminum, and other metals or plastics, etc. It may be described as a rigid support frame with aligned pivotal features that have an inside cavity or diameter 157 that can accommodate different types of flywheel sets, and their support structures, and may provide pivotal support for them.

This outer hoop frame may be hoop shaped with four pivotal features. The holes 101G and 101H may be substantially aligned with each other on the axis Y, and may be centered in the hoop's inside diameter and thickness of its plane 158. The holes 101I and 101J may be substantially aligned with each other and may bisect the hoop's inside diameter and the thickness of its plane, and may be perpendicular to the holes 101G and 101H. When the two turnbuckle ends extend through the outer hoop and pivotally connect the double gimbal axle along its Y2 axis, which houses the flywheel ring 122, and along that pivotal axis, the gimbal block assembly is pivotally connected, and it houses the flywheel 100. That completes a basic wheel and ring gyroscopic balance unit 114.

Figure 3:
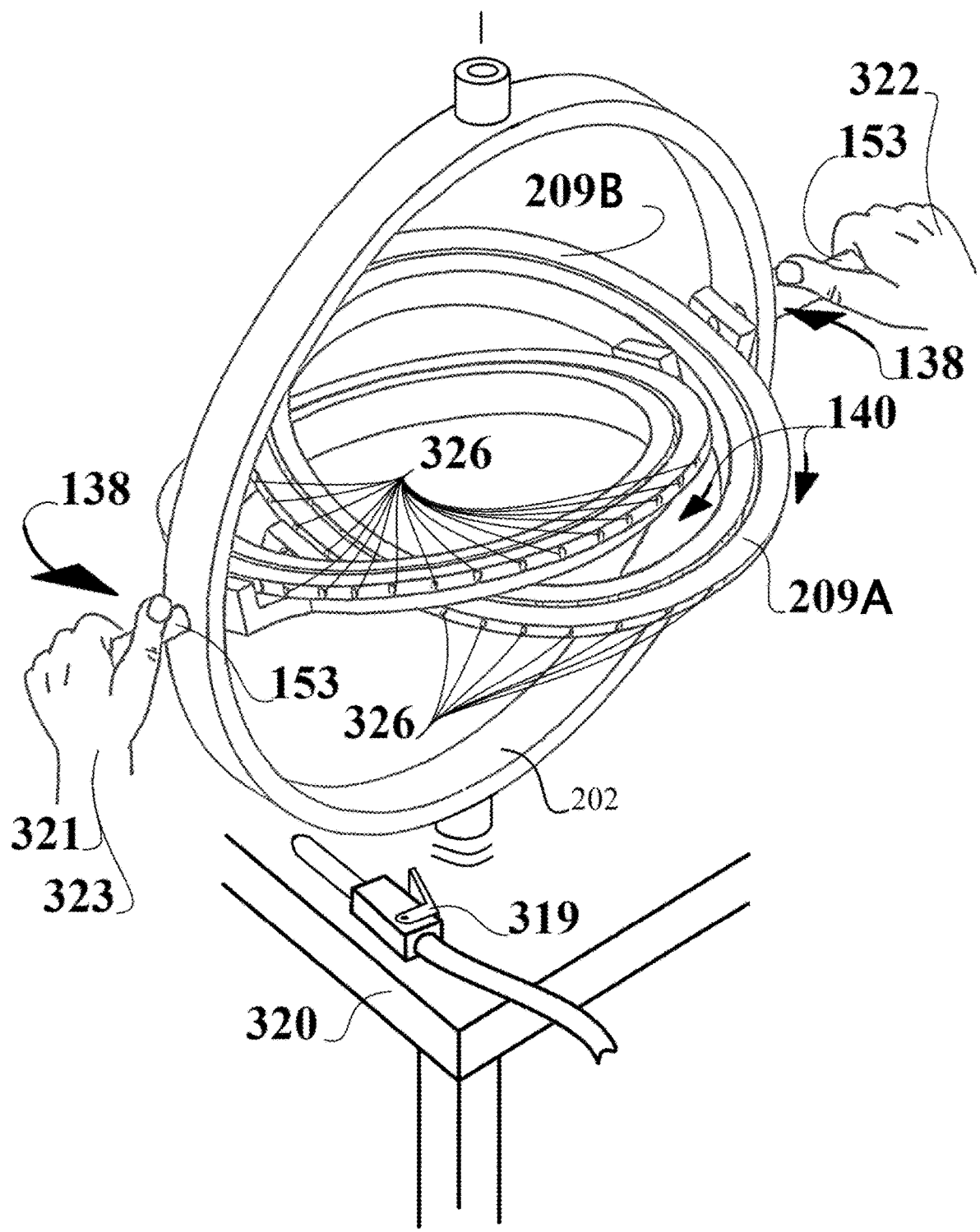
FIG. 3 is a perspective view of the twin ring gyroscopic balance unit

FIG. 3 is a perspective view of the twin ring gyroscopic balance unit 202. The two twin rings 209A and 209B have the notches 326 around their outside diameter so they can be driven without motors if desired. Both flywheel rings have been spun at a rapid speed using the air nozzle 319 in a clockwise direction 140. They are both positioned in a good start position as described in FIGS. 7E and 7F. The operator 321 is holding onto the two-turnbuckle ends 153 with his right hand 322 and his left hand 323, positioning them to be horizontal. The system is primed with the two flywheel rings in position and rapidly spinning. He rotates the balance unit in the clockwise direction 138, inducing dual-balanced gyroscopic precession. The unit starts to lift off the table 320 as he tried to hold it down, it pushes up, and he is getting a real workout as he rotates the balanced unit, as described with the wheel and ring balance unit in FIG. 1, as these units would operate basically the same.

Figure 4:
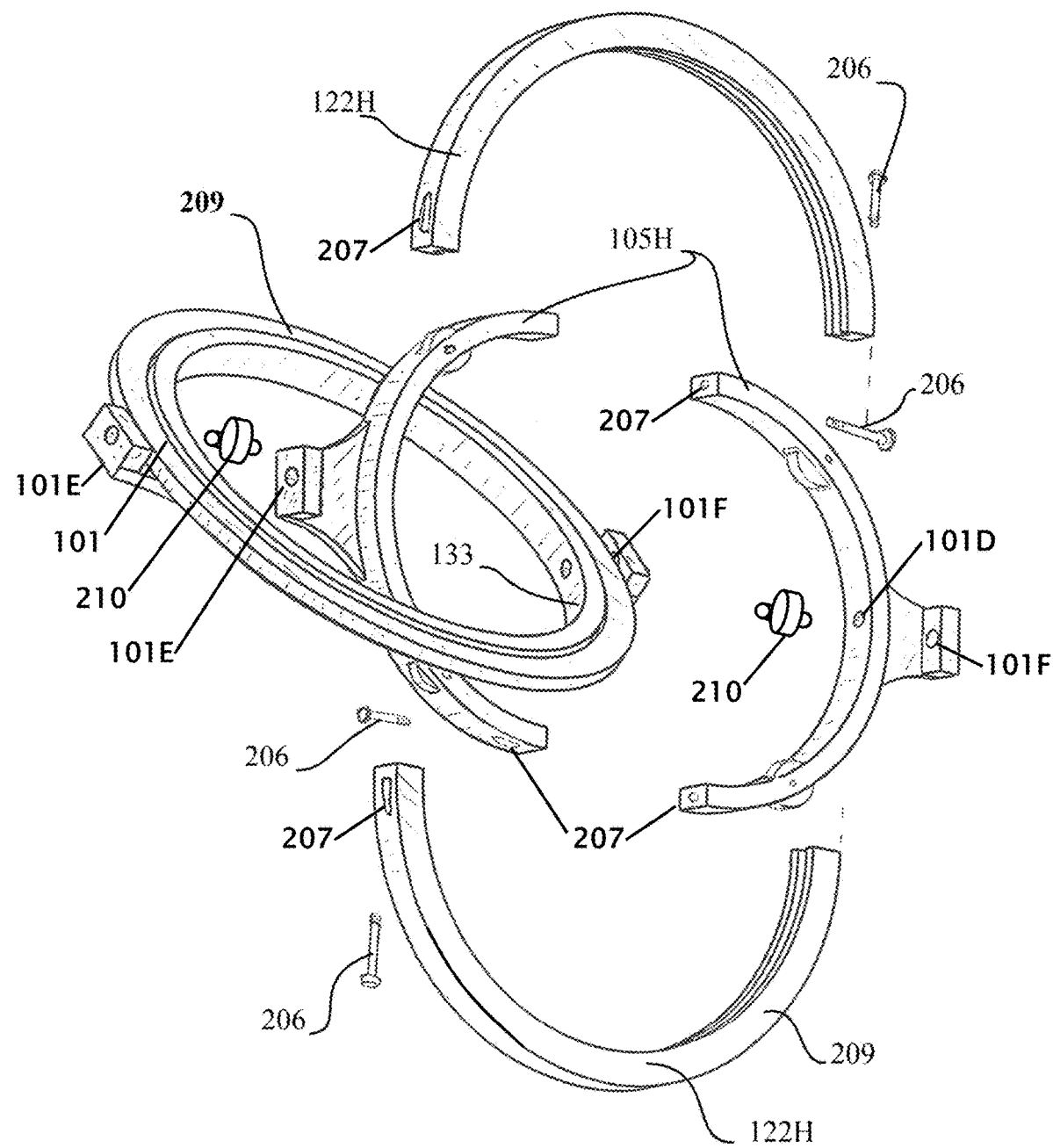
FIG. 4 is a perspective assembly view of a flywheel twin rings being assembled to interlink with each other.

FIG. 4 is a perspective assembly view of a flywheel ring 122 and a double gimbal axle 105, being assembled with another flywheel ring, and another double gimbal axle. The two flywheel rings and the two axles have been cut in-half, thereby creating the new half-axle 105H and the half-flywheel ring 122H. These parts are being assembled, so they are interlinked with each other and fastened back together with the bolts 206 and the holes 207 thereby creating the ring assembly 209. A pin 210 with a shoulder, maybe inserted in two places, pivotally connecting the holes 101D and 101F and then the holes 101E and 101C. The outer holes 101E and 101F may be pivotally connected to a hoop 106 using two turn buckle ends would go through the hole in the hoop on one side and into the hole 101E and the other into the hole 101F similar to the assembly shown in FIG. 2.

Figure 5:
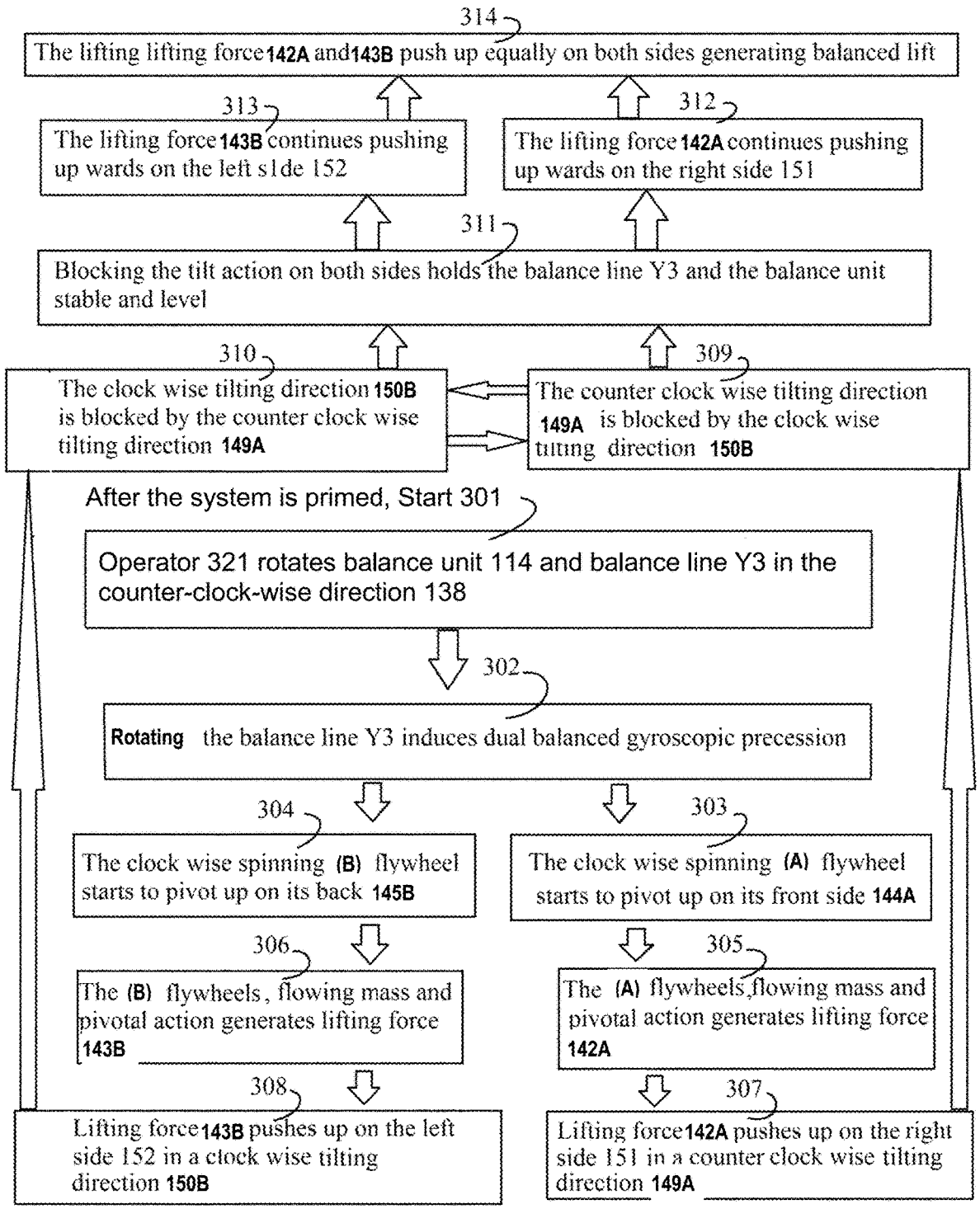
FIG. 5 shows a two-dimensional flow chart that discloses the method of operation

FIG. 5 shows a two-dimensional flow chart that discloses the method of operation that would be applied to a gyroscopic balanced unit to develop "dual-balanced" gyroscopic precession. The method of operation has been given a label, "The Precessional Propulsion Method". It can be used to operate the wheel and ring, gyroscopic balanced unit, and the twin ring gyroscopic balance unit. This method of operation could briefly be described as priming the system and then activating it.

Before describing the process and operation of a gyroscopic balance unit, a quick review of its basic physical features is given. The operation itself has been divided into two separate sections. First, the step-by-step process to prime and set up the balance unit for activation, and second, is a description of the activation and its series of step-by-step reactions.

A "gyroscopic balance unit may be described as an apparatus with an outer hoop frame that pivotally houses the two flywheels from a matching set that should be supported, so each one can spin or rotate in a circular path. Each flywheel could be pivotally housed, and supported on an axis that substantially bisects its diameter and plane. They may also be substantially concentric with each other. Those two pivotal axes could be substantially aligned with each other, and physically connected directly or indirectly as well as being pivotally connected to the outer hoop frame.

Operation

1. The first part of the operation would be to prime the system or set it up. The gyroscopic balance unit may be placed with the outer hoop frame in its normal operating position for exercise in this example with aligned pivotal Y1 and Y2 axes (also called the balance line Y3) on the horizontal plane 147.

2. The two flywheels could be pivotally positioned so their planes are in a type of open-scissor configuration relative to a flat horizontal plane 147 as shown in FIGS. 6E and 6F for a wheel and ring embodiment, and as shown in FIG. 7E and 7F for a twin ring embodiment, these positions are referred to as a good start position.

3. The two flywheels could then be spun or driven into rapid speed in the same direction. In this example, it's the clockwise direction 140. Now the system is primed and ready for activation. In this example, the second part of the operation could be described as an action that starts a series or reactions.

Activation could begin by applying a toque force to rotate the outer hoop frame, and thus the entire balance unit in a counterclockwise direction 138. This force may be applied along a horizontal plane so as to change the radial position of the aligned axes Y1 and Y2, inducing "dual-balanced gyroscopic precession" which instantly imposes a number of forces in different directions upon the aligned pivotal axis, thus transforming them from being regular pivotal connections on aligned axis, to taking on a new role as the balance line Y3. The two rapidly spinning flywheels are driven into a pivotal swing simultaneously in the same direction as gyroscopic precession is induced as their flowing masses (the spinning flywheels) change direction, force is generated that is pushing up on the balance line, "generating a balanced lift" or upward pushing force.

All rotational directions described in all the specifications may be reversed. The right and left sides of the balance unit are also the right and left sides of the balance line, as it represents the substantial alignment of the pivotalv Y1 and Y2 axes in the balance unit. A balanced unit may be positioned in any direction, to push perpendicular to the rotational plane of its balance line Y3

Two-Dimensional Flow Chart

This flow chart starts with:

Step 301: The operator or machine rotates the balance unit in a counterclockwise horizontal direction 138.

Step 302: Rotating the radial position of the balance unit which rotates its aligned horizontal pivotal axis, the balance line, inducing dual-balanced gyroscopic precession, as both flywheels simultaneously start to pivot.

As this flow chart refers to both the wheel and ring, and the twin ring embodiments. (A) Refers to a flywheel 100A, in a wheel and ring set and also refers to a flywheel ring 122A, in a twin ring set. (B) Refers to a flywheel ring in a wheel and ring set, or the second flywheel ring 122 in a twin ring set. Step 303: The (A) flywheel is spinning in a clockwise direction 140 and starts to pivot upward on its front side 144A.

Step 304: Taking place at the same time as step 303, the (B) flywheel is also spinning in the same clockwise direction 140 and starts to pivot upward on its backside 145B.

Step 305: The spinning (A) flywheel's flowing mass and pivotal action generates the lifting force 142A.

Step 306: The spinning (B) flywheel's flowing mass and pivotal action generates the lifting force 143B. It may be similar in magnitude to the force generated by the (A) flywheel.

Step 307: The lifting force 142 pushes upward on the balance unit's right side 151 in a clockwise tilting direction 149A.

Step 308: The lifting force 143 pushes upward on the balance unit's left side 152 in a clockwise tilting direction 150.

Step 309: The counterclockwise curved tilting action 149A is now blocked by the opposing clockwise action 150B.

Step 310: The clockwise curved tilting action 150B is now blocked by the opposing counterclockwise tilting action 149A.

Step 311: Blocking the tilting action on opposing sides, holds the balance line Y3 and the balance unit stable and level as they are rotated on a horizontal plane in the counterclockwise direction 138.

Step 312: The lifting force 142 from the (A) flywheel's pivotal action continues pushing upwards in a counterclockwise direcitonI49 on the right side 151.

Step 313: Lifting force 143 from the (B) flywheel's pivotal action continues pushing upwards in a clockwise direction 150 on the left side 152.

Step 314: As described, with the tilting action blocked, as the two flywheels continue to pivot and change their direction, they generate force 142A and 143B, simultaneously pushing upward on the right and left sides of the balance unit, generating balanced upward pushing that could be described as pushing upward and perpendicular to the rotation of the balance unit to cause lift and propulsion.

FIGS. 6A 6F and 7A-7F show a series of pivotal path two flywheels from a matching set would take during dual-balanced gyroscopic precession. Only flywheels are shown in these figures. The matching set of two flywheels is constantly in motion. They are not only rapidly spinning in the same direction, but also constantly pivoting and changing the position of their planes in a type of scissor-like motion, continuously oscillating by opening and closing actions. For illustration purposes, the continuous pivotal action of the two flywheels has been frozen in various different positions or stop motion position. Each particular stop motion position is shown in front and side views. The side view is shown sectioned, and each stop motion position is shown in sequential order. The diagrams of pushing or lifting force is not illustrated in these figures, only the movement of the flywheels.

The F6 figure series depicts the pivotal motion of the wheel and ring flywheel set, and the F7 figure series depicts the pivotal motion of the twin ring flywheel set. Each type of flywheel set is shown in three different pivotal positions, positions A, B and C as shown, in a front and side view. All flywheel sets have already been primed. They are all spinning in the same clockwise direction 140, and arranged in a good start position, in an open scissor-type of configuration. Each flywheel pivotal angle abbreviated to PA1 and PA2 are positioned just above the horizontal plane 147. The first position to be described would be position starting at the bottom of the page. Position I is shown in a front view in FIG. 6E and in a side view in FIG. 6F. Position 1 is also shown in a front view in FIG. 7E and in a side view in FIG. 7F. Starting with position 1 to activate the system. The balance line Y3 is rotated in a counterclockwise direction 138 as the two flywheels rapidly spin in a clockwise direction 140. This action starts the two flywheels to pivot the (A) flywheel's front side 144A. It starts to pivot upward, increasing the size of its pivotal angle PA1 from the horizontal plane 147. Simultaneously, the (B) flywheel's backsides 145B starts to pivot upwards, increasing the size of its pivotal angel PA2 from the horizontal plane 147. This may be described as the beginning of a first stroke, and the beginning of one full cycle as dual-balanced gyroscopic precession is induced. The pivotal actions of the two flywheels are generating balanced upward push or lift in FIGS. 6C, 6D, 7C and 7D the first stroke continues as the pivotal axis (the balance line Y3) is rotated further in a counterclockwise direction 138. Driving the (A) flywheel's front side 144A even higher and increasing its pivotal angle PA1 from the horizontal plane 147. Simultaneously, this drive's (B) flywheel's backside 145B higher and increases its pivotal angel PA2 from the horizontal plane 147.

In FIGS. 6A, 6B, 7A, 7B, the first stroke continues as the pivotal axis (the balance line Y3) is rotated even further in the counterclockwise direction 138. This drives the (A) flywheel's front side 144A and the (B2) flywheel's backside 145B even higher, increasing their pivotal angles PA1 and PA2 from the horizontal plane 147. As the two flywheels pivot higher, they near a vertical position but without ever reaching that position, the first stroke is already complete. The length of a single stroke may be described as a flywheel starting just above the horizontal plane and pivoting upwards to just before a vertical position. A single stroke could be described as a pivotal arc of less than 90 degrees. The two flywheels have reached the top of their first stroke, somewhere near a vertical position. As just mentioned in that position, a sudden reversal of the balance line Y3 can change directions, and be rotated in a clockwise direction 140. This action starts the two flywheels to pivot in the opposite direction as they pivot from a near vertical position back to a near horizontal position, and may be described as the beginning of the second stroke. The pivotal positions of the flywheels are actually the same at the end of the first stroke, and the beginning of the second.

Figure 8:
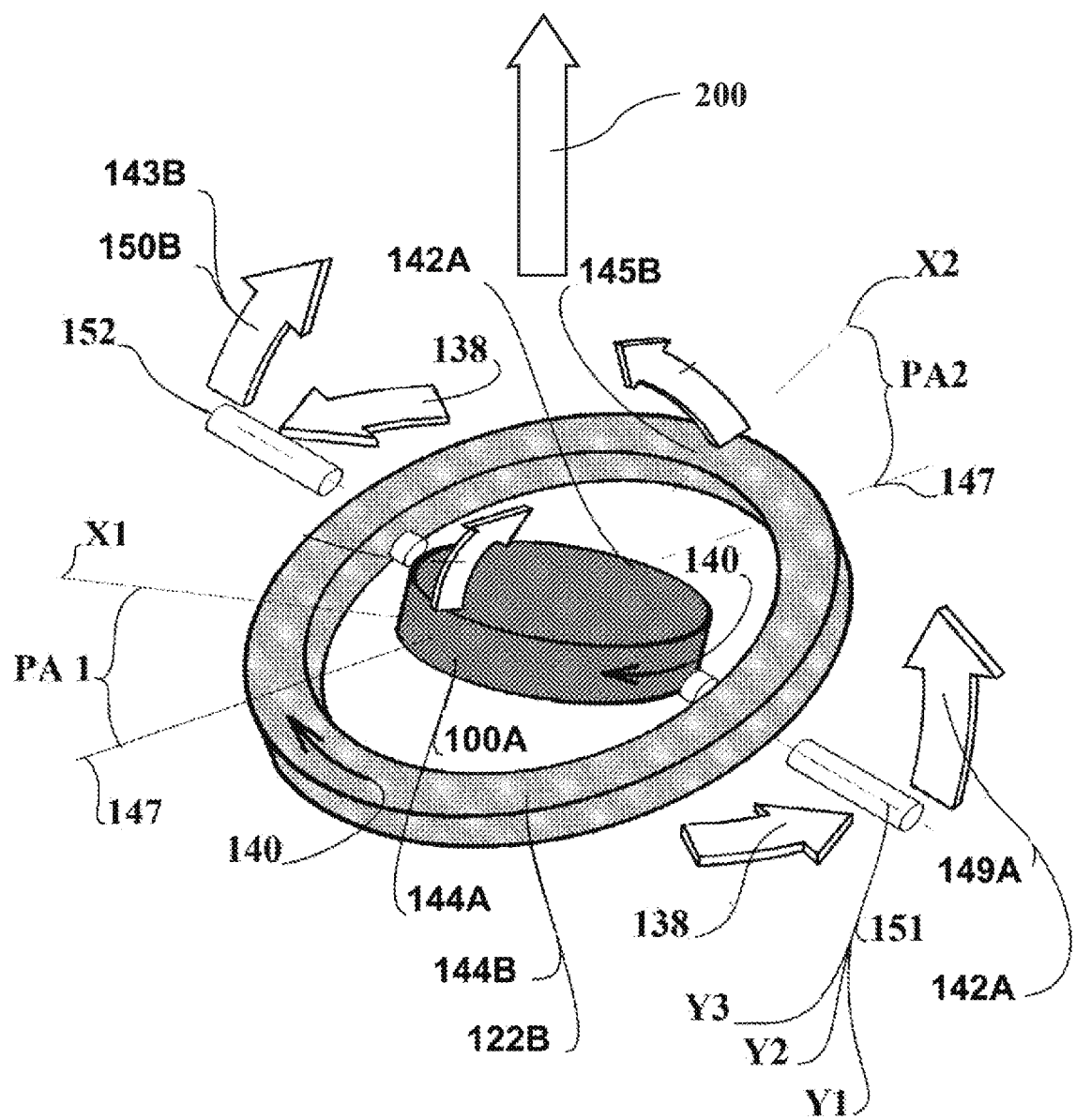
FIG. 8 shows the wheel and ring set with the flywheel, and the flywheel ring.
Figure 9:
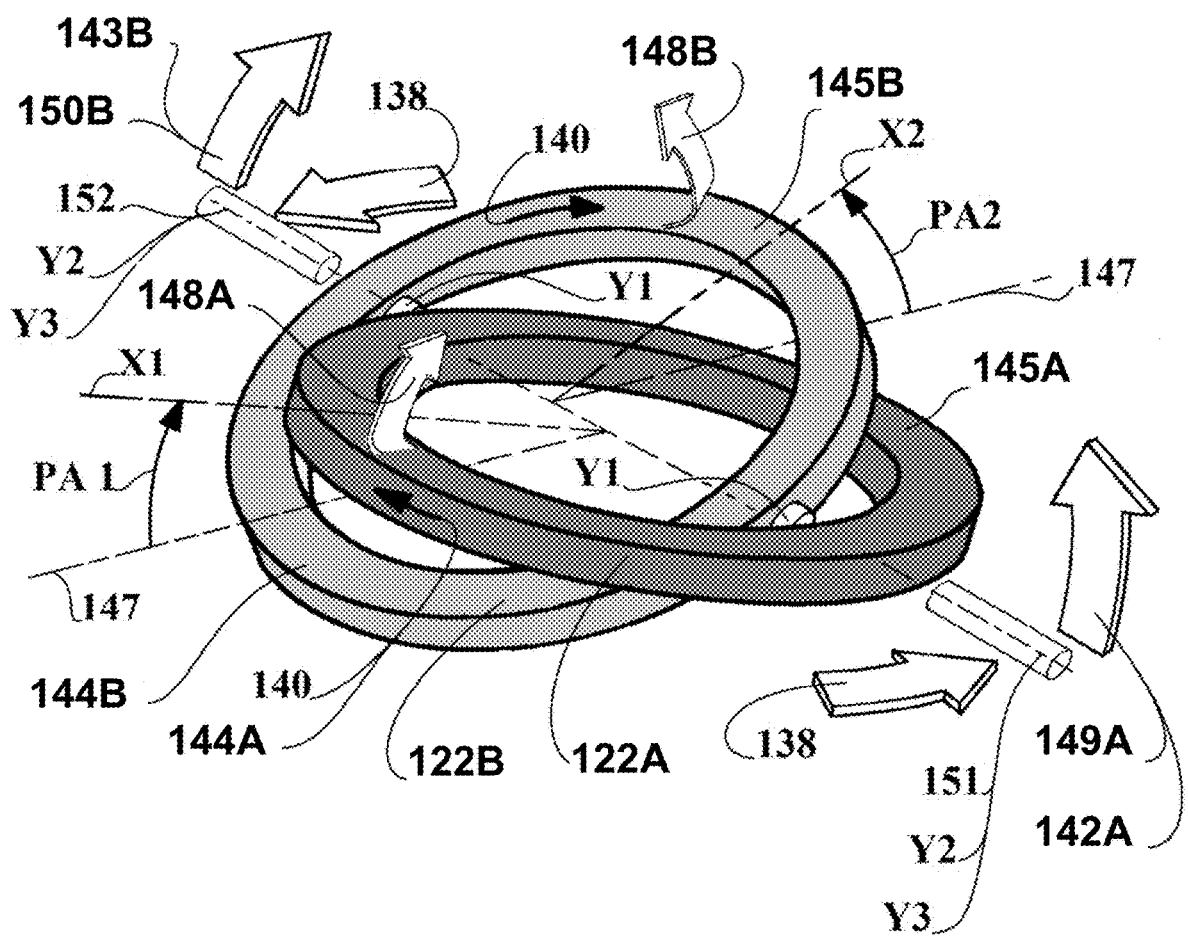
FIG. 9 shows the twin ring set with the flywheel ring and the flywheel ring.

FIG. 8 shows the wheel and ring set with the flywheel, and the flywheel ring and FIG. 9 shows the twin ring set with the flywheel ring and the flywheel ring.

The centerline X is used to identify the position of a flywheel's plane, as it would bisect a flywheel's diameter and the thickness of its plane. The axis Y is used to identify the pivotal axis of a flywheel, and it also bisects the flywheel's diameter and the thickness of its plane. The centerline X and the pivotal axis Y would be perpendicular to each other, and would intersect at the flywheel's center or spin axis. The centerline 23 is used to identify a substantially vertical axis and runs through the center of the entire gyroscopic balance unit, and is substantially perpendicular to the horizontal plane 147. The pivotal position of the (A) flywheel's plane is labeled XI, and its pivotal axis is labeled Y1. The pivotal position of the (B) flywheel plane is labeled X2, and its pivotal axis would be labeled Y2. When the pivotal axis (YI) of the (A) flywheel is substantially aligned with the pivotal axis Y2 of the (B) flywheel, that alignment is labeled the balance line Y3. The pivotal angle of a flywheel's plane could be measured from the common horizontal plane 147. For the (A) flywheel, the pivotal angle would be labeled PAI, and for the (B) flywheel, the pivotal angle would be labeled PA2. This gyroscopic balance unit is shown in its basic upright opening position with its axis Y3 and the balance line substantially horizontal. The flywheel 100A and the flywheel ring 122B are spinning at a fast rate, from methods described herein, in the same direction. In this example, it is clockwise 140, but it could be counterclockwise if other positions and rotations were reversed.

The two flywheel planes X1 and X2 are tilted in opposite directions, just above the horizontal plane 147 at pivotal angles PA1 and PA2. This pivotal position may be described as an open scissor-type of configuration, and is referred to as a good start position. The system is primed and ready for activation when its flywheels are spinning and in position. At that point, a counterclockwise torque force 138 can be applied in a horizontal direction, thus the precessional propulsion method described earlier is being applied as both flywheels' planes start to change position by pivoting upwards and increasing their pivotal angles PA1 and PA2. This action brings the balance line to life as dual-balanced gyroscopic propulsion is induced, as the center of activity within the gyroscopic balance unit where certain forces are counteracted, and other forces flow together in harmony to generate balanced linear pushing force 200 propulsion or lift. When a standard gyroscope is compared to the gyroscopic balance unit during dual-balanced gyroscopic precession, you see that a single gyroscope is driven into gyroscopic precession, and the result is one side tilts.

When two gyroscopes are driven into gyroscopic precession, the result is two tilting forces in any direction causing uncontrolled bouncing and jumping. When two gyroscopes are arranged so that dual-balanced gyroscopic precession can be enacted, forces are balanced, positions are balanced, tilting is balanced, and pivotal action is balanced in and around the balance line. The combined effect of all these actions is greater than the sum of their separate effects, and may be considered synergy, as gyroscopic forces are harnessed and flow together in harmony, resulting in balanced gyroscopic linear propulsion.

Figure 7A:
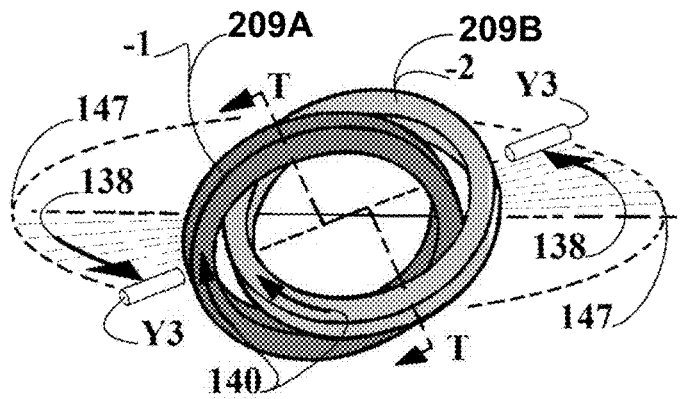
FIG. 7A-7F show a series of pivotal path two flywheels, the wheel and ring style.
Figure 7B:
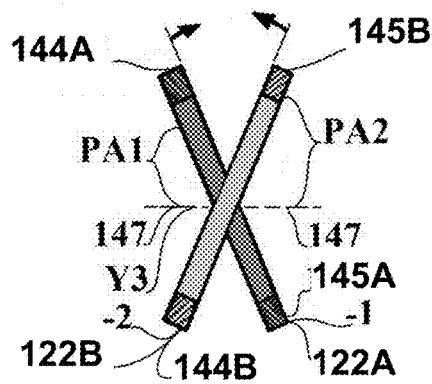
Figure 7C:
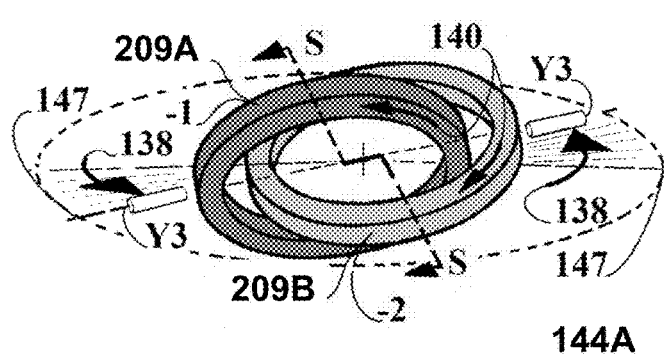
Figure 7D:
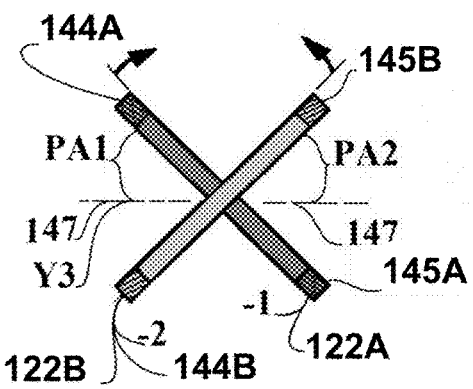
Figure 7E:
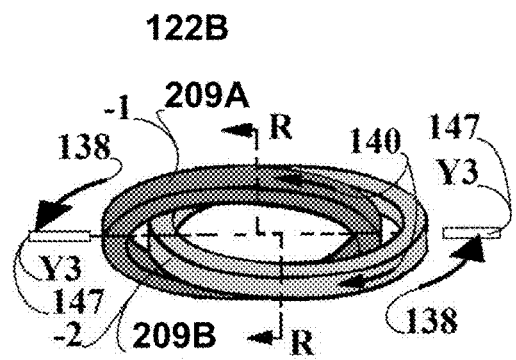
Figure 7F:
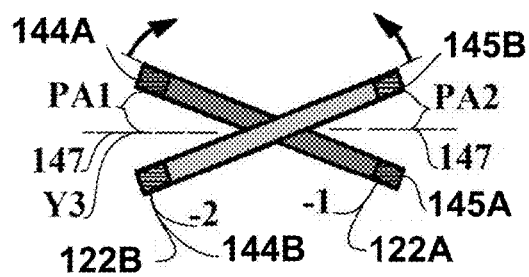

FIGS. 6C and 7C are perspective views of a wheel and ring gyroscopic balance frame 116. This particular type of balance frame is designed to house a flywheel and flywheel ring set.

Referring to all types of flywheel sets: To distinguish one flywheel from another in a matching set of two, one of the flywheels within the set has (A) added to the end of its part number, and the other flywheel within that same set has (B) added to the end of its part number. A wheel and ring set would have a (A) flywheel ring and a (B) flywheel ring. A twin ring set would have one flywheel ring with a (A), and the other would have a (B). This opening and closing scissor-like pivotal action of two flywheels continues like an oscillating mechanical wave action that repeats over and over as the cycles continue; thus, balance lift is continued. Upward push or the orientation of a balance unit can be changed to push in any direction.

Thus, specific embodiments of an gyroscopic balance unit and precessional propulsion method have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A gyroscopic unit comprising:
   the unit rotatable as a whole about a unit axis , the unit comprising:
   a frame rotatable about the unit axis;
   an outer gyroscope attached to the frame through first gimbals and having a first gimbal axis miss-aligned to the unit axis and having an outer flywheel; and
   inner gyroscope attached to the outer gyroscope through second gimbals and having a second gimbal axis miss-aligned to the unit axis and having an inner flywheel;
   wherein the first gimbal axis is coaxial with the second gimbal axis.

2. The gyroscopic unit of claim 1, wherein:
   the outer gyroscope has a gimbal axis that is perpendicular to the unit axis, and the inner gyroscope has a gimbal axis that is perpendicular to the unit axis.

3. The gyroscopic unit of claim 1, wherein the inner and outer flywheels have matched angular momentum while the unit is operating.

4. The gyroscopic unit of claim 3, wherein:
   the first gimbal axis is coaxial with the second gimbal axis;

the inner and outer flywheels rotate at angular velocities to produce the matched angular momentum; and said inner and outer flywheels pivot simultaneously in a scissors action about the first and second gimbal axes.

5. The gyroscopic unit of claim 1, wherein:

the unit axis is aligned to be vertical;

the first gimbal axis and the second gimbal axis are aligned to be horizontal;

the outer flywheel is tilted about the first gimbal axis at a first tilt away from the horizontal;

the inner flywheel is tilted about the second gimbal axis in a direction away from the horizontal; and rotating the unit about the unit axis produces a first tilting torque about the first pivotal gimbal axis and a second tilting torque about the second pivotal gimbal axis, that oppose each other and develop stability.

6. A gyroscopic balance unit, comprising:

A rotatable frame having an axis A;

a first gyroscope having a first gyroscopic flywheel having a first pivotal gimbal axis not aligned with the axis A;

a second gyroscope having a second gyroscopic flywheel having a second pivotal gimbal axis not aligned with the axis A;

said first gyroscopic flywheel is an outer flywheel and said second gyroscopic flywheel is an inner flywheel residing inside the outer flywheel;

said first gyroscopic flywheel is pivotally gimbaled to said frame, and said second gyroscope flywheel is pivotally gimbaled to said first gyroscope; and the spinning gyroscopic flywheels generate matched magnitudes of angular momentum;

tilts of the gyroscopic flywheels about the pivotal gimbal axes are positioned opposite to each other so a first torque, from the first gyroscopic flywheel created by rotation of the unit about the axis A, is opposite to a second torque, from the second gyroscopic flywheel created by rotation of the unit about the axis A.

7. The gyroscopic balance unit of claim 6, wherein the first pivotal gimbal axis and the second pivotal gimbal axis are coaxial.

8. The gyroscopic balance unit of claim 6, the first pivotal gimbal axis and the second pivotal gimbal axis are perpendicular to axis A.

9. The gyroscopic balance unit of claim 6, wherein the balance unit is rotated in the opposite direction the flywheels are spinning, when the first gyroscopic flywheel and the second gyroscopic flywheel are tilted in opposite directions about the pivotal gimbal axes in a wide open scissors position, and spinning the same clockwise direction.

10. A gyroscopic balance unit, comprising:

a rotatable frame having an axis A, the balance unit rotatable about an axis parallel to the axis A;

a first gyroscopic flywheel having a first pivotal gimbal axis misaligned to the axis A;

a second gyroscopic flywheel having a second pivotal gimbal axis misaligned to the axis A;

the first gyroscopic flywheel is pivotally connected directly to the frame thru said first pivotal gimbal axis;

the second gyroscopic flywheel is pivotally connect indirectly to the frame thru said second pivotal gimbal axis;

said first gyroscopic flywheel and said second gyroscopic flywheel rotate to generate matched magnitudes of angular momentum when spinning;

said first gyroscopic flywheel and said second gyroscopic flywheel rotate to generate matched magnitudes of angular momentum;

said first pivotal gimbal axis and said second pivotal gimbal axis are positioned relative to each other so that a first torque from the first gyroscopic flywheel pushes on the first pivotal gimbal axis and a second torque from the second gyroscopic flywheel pushes on the second pivotal gimbal axis;

the first torque is equal in magnitude and opposite in direction to the second torque.

11. The gyroscopic balance unit of claim 10, wherein:

the precessional tilting torques are balanced, the angular momentums are balanced; and the gyroscopic flywheels pivot simultaneously, and are balanced.

12. The gyroscopic balance unit of claim 10, wherein the pivotal gimbal axes are coaxial to each other and perpendicular to axis A.

13. The gyroscopic balance unit of claim 6, wherein the first pivotal gimbal axis and the second pivotal gimbal axis are coaxial.

14. The gyroscopic balance unit of claim 10, wherein the first pivotal gimbal axis and the second pivotal gimbal axis are coaxial.

15. The gyroscopic balance unit of claim 1, wherein:

the first gimbal axis bisects the outer flywheel;

the second gimbal axis bisects the inner flywheel; and the inner and outer flywheels axles are free to pivot at each end, about their pivotal gimbal axis.

* * * * *